United States Patent [19]

Bergner et al.

[11] Patent Number: 4,930,878
[45] Date of Patent: Jun. 5, 1990

[54] ACHROMATIC PHASE RETARDER ARRANGEMENT

[75] Inventors: Joachim Bergner, Jena; Rainer Danz, Kahla; Hartmut Heinz, Jena, all of German Democratic Rep.

[73] Assignee: Jenoptik Jena GmbH, Jena, German Democratic Rep.

[21] Appl. No.: 247,022

[22] Filed: Sep. 20, 1988

[51] Int. Cl.$^5$ .................... G02F 1/01; G02B 5/04
[52] U.S. Cl. .................... 350/394; 350/286; 350/163
[58] Field of Search ............... 350/394, 395, 402, 286, 350/163, 169

[56] References Cited

U.S. PATENT DOCUMENTS

| | | | |
|---|---|---|---|
| 2,964,635 | 2/1960 | Harrick | 350/394 |
| 3,597,701 | 3/1971 | Cornillault | 350/286 |
| 3,635,563 | 1/1972 | Mouchart | 350/394 |
| 4,514,047 | 4/1985 | Haskal et al. | 350/394 |

OTHER PUBLICATIONS

J. M. Bennett, "A Critical Evaluation of Rhomb-Type Quarterwave Retarders", Appl. Opt. 9(1970)9, pp. 2123-2129.

Primary Examiner—Jon W. Henry
Attorney, Agent, or Firm—Jordan and Hamburg

[57] ABSTRACT

An achromatic phase retarder comprises at least one prismatic body with two total reflection surfaces. The light entry surface forms an angle of incidence $\alpha$, which is different from 90°, with the direction of incidence of a light beam, and a first total reflection surface forms a defined angle $\phi$ with the light entry surface.

2 Claims, 3 Drawing Sheets

ACHROMATIC PHASE RETARDER ARRANGEMENT

FIELD OF THE INVENTION

The invention is directed to optical arrangements in which the use of circularly polarized parallel light bundles is more advantageous than that of linearly polarized light bundles.

For example, when used in laser arrangements as an optical isolator, the invention prevents the effect of reflected and scattered light on the light source and the detector. In optical memory technology in arrangements with beam dividers, it permits energy to be transported between the light source and the detector with a high degree of efficiency. The same is true for optical transmission technology when using lasers and beam dividers. In laser ellipsometers, a quarter-wavelength phase retarder of the invention can be used to analyze the elliptically polarized light reflected from the sample, as well as in measurement arrangements to determine the optical rotational dispersion and the circular dichroism.

Finally, in microscope spectrophotometers, it can reduce the effect of scattered light.

BACKGROUND OF THE INVENTION

Many solutions are known for achromatic phase retarders, of which only those based on prismatic glass bodies are considered in the following, since the path difference of other solutions (foil combinations, crystal combinations) is significantly more dependent on the wave length.

With a known solution, the FRESNEL rhombus (Appl. Opt. 9 (1970) 9, pages 2123-2129), the preferably desired phase difference of 90°, corresponding to a path difference of lambda/4, between the p- and s-components of the light wave that is linearly polarized at an angle to the incident plane, is achieved by double total reflection, the incident light beam striking the retarder entry surface perpendicularly. It is a disadvantage of this solution that the wavelength error of the phase difference in the wavelength range from 400 nm to 1000 nm is ±1.3°. In another known solution, a modified DOVE prism (U.S. Pat. No. 4,514,047) three total reflection surfaces are provided. Compared to the FRESNEL rhombus, this has solution has advantages, but still has the same wavelength error. To reduce this wavelength error, glass would have to be used with an index of refraction and with a dispersion, which do not exist in practice.

Furthermore, a solution is known in which a glass prism coated with magnesium fluoride is used, in which four total reflections take place (FILINSKI and SKETTRUP, Appl. Opt. 23 (1984) 16, p. 2747). In the spectral range of 400 nm to 700 nm, the wavelength error of the phase difference is reduced to ±0.61°. It is a disadvantage of this method that applying a magnesium fluoride layer on the glass body is technologically complicated and difficult to control.

With another known solution, the hypotenuse of a glass prism is coated with a dielectric multilayer (U.S. Pat. No. 4,595,261). Admittedly, a wavelength error of the phase difference of 0.02° is attained, but only at wavelengths ranging from 740 nm to 980 nm. Here too, another disadvantage is that manufacture of this prism is technologically complicated.

SUMMARY OF THE INVENTION

The object of the invention is to provide an achromatic phase retarder which can be used at least in the visible spectral range of light, but preferably also in the near infrared and the near ultraviolet range. It must be possible to produce it with little technological effort and it should have a small overall length and should not be limited to the use of special glasses.

It is also an object of the invention to provide an achromatic phase retarder which can be used at least over the visible spectral range of light, but preferably also in the near infrared and the near ultraviolet range, and has a deviation of the phase difference $\delta$ from the value $\delta_s$ fixed at an effective wavelength $\lambda_s$, which, in the interests of a maximum extinction, should not exceed a value of 0.1%. Moreover, the phase retarder should have the fewest possible surfaces of total reflection.

Pursuant to the invention, this objective is achieved by providing an achromatic phase retarder comprising at least one prismatic body and two surfaces of total reflection. A light entry surface forms an angle of incidence other than 90° with the incidence direction of a light beam. A first total reflection surface makes an angle with the light entry surface, with the proviso that the two angles are selected so that, for a light beam of short wavelength, refracted at the light entry surface, an angle of incidence results at the first total reflection surface, which is larger than the angle of incidence of a refracted light beam of longer wavelength. A second surface of total reflection is parallel to the first surface of total reflection and a light exit surface, which refracts the refracted and reflected light beams, is parallel to the light entry surface.

Advantageous refinements of the invention are such that the incident angle of the light beam at the light entry surface is chosen so that the difference between the angles of refraction of short wavelength light and medium wavelength light or the difference between the angles of refraction of medium wavelength light and long wavelength light is identical with the difference between the corresponding angles of incidence at the first total reflection surface according to the equation:

$$|\text{arc sin}(\sin \alpha / n_S) - \text{arc sin}(\sin \alpha / n_K)| = |\theta_S - \theta_K|$$

or $$|\text{arc sin}(\sin \alpha / n_L) - \text{arc sin}(\sin \alpha / n_S)| = |\theta_L - \theta_S|$$

where
$\alpha$ is the angle of incidence at the light entry surface
$n_L$ is the refractive index for long wavelength light
$n_S$ is the refractive index for medium wavelength light
$n_K$ is the refractive index for short wavelength light and
$\theta_L$ is the angle of incidence for long wavelength light
$\theta_S$ is the angle of incidence for medium wavelength light
$\theta_K$ is the angle of incidence for short wavelength light at the first total reflection surface
and the angle $\phi$ is determined by the relation $$\phi = \theta_S + \text{arc sin}(\sin \alpha / n_S).$$

as well as such that the length of the body of the achromatic phase retarder is selected so that the number of total reflections is even, and such that it comprises a transparent material with a refractive index $n_c \geq 1.7$, an arbitrary ABBE number $\nu_e$, and a stress-optical constant $B \leq 0.5$ TPa$^{-1}$.

To generate a phase difference of 90° or of 180°, the length of the body of the achromatic retarder is selected pursuant to the invention so that two total reflections take place in the achromatic retarder for a 90° phase difference, and four total reflections take place for a 180° phase difference. The action of the achromatic phase retarder, designed pursuant to the invention, relies upon a new principle of autocompensation of the phase error through the dispersion of the achromatic phase retarder. Due to the parallel arrangement of the light exit surface and the light entry surface, beams of different wavelengths leave the achromatic phase retarder parallel to one another. The radiation reflected at the retarder-air interface is eliminated completely from the beam path, so that no reflection-reducing coatings are required on the achromatic phase retarder. Such coatings would, on their part, negatively influence the polarization state.

With the achromatic phase retarder of the invention, the achromatism is improved and stray light is reduced. Compared to the known solutions, a considerable increase in contrast is achieved. Compared to the previously known best achromatic phase retarder, the phase error is reduced by an order of magnitude within its operating range (678 nm to 868 nm). The operating range of the achromatic phase retarder of the invention is altogether much greater. From 350 nm to 1014 nm, the phase error is $\leq 0.05°$. In an embodiment for the wavelength range from 546 nm to 1813 nm, the phase error is $\leq 0.02°$. The technological effort involved in manufacturing this embodiment is slight.

BRIEF FIGURE DESCRIPTION

The invention will now be described below by means of the accompanying drawings, wherein:

FIG. 1 schematically shows the disposition of the active surfaces and of the beam path in the achromatic phase retarder.

DETAILED DISCLOSURE OF THE INVENTION

Figure 1:
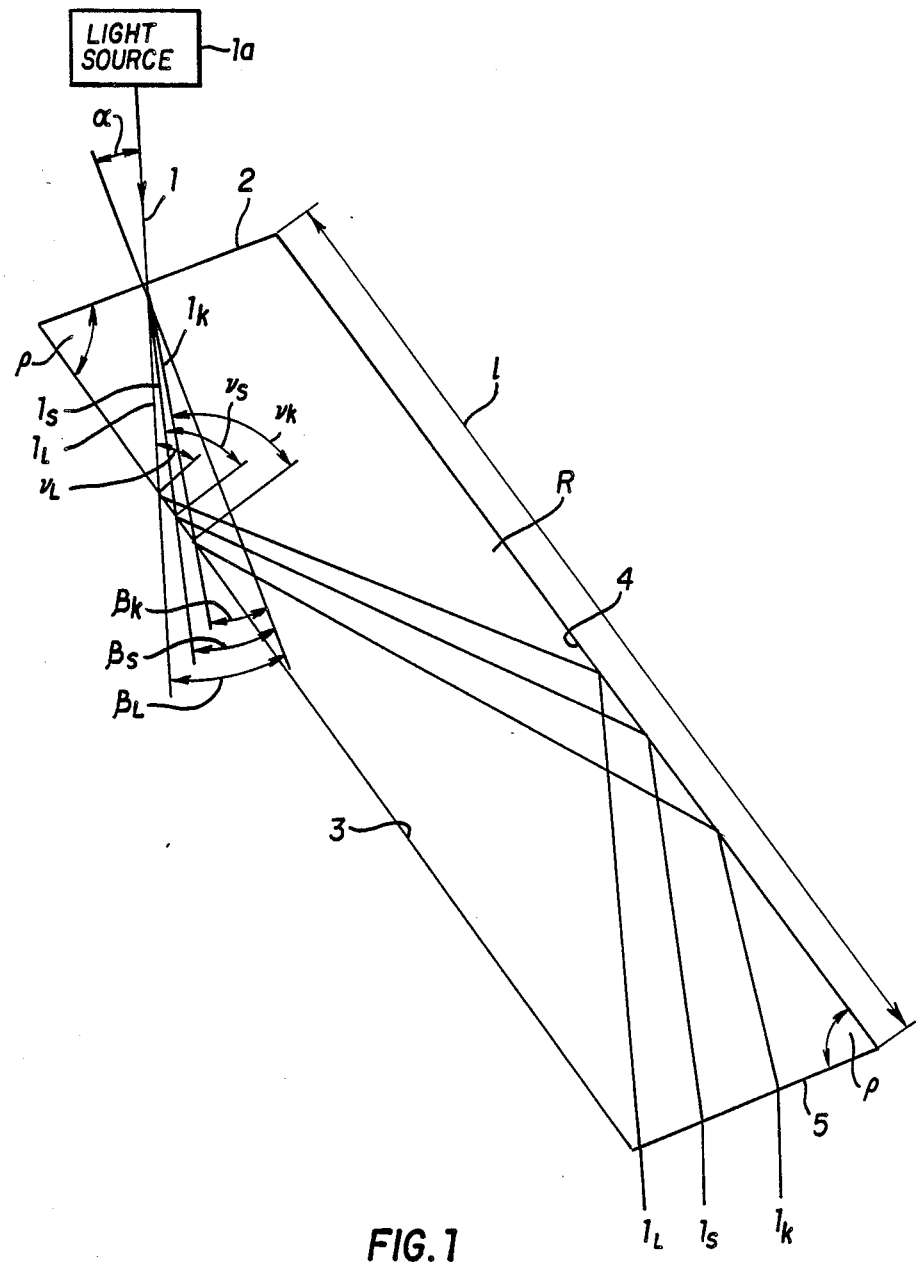

The achromatic phase retarder comprises at least one prismatic body of transparent material with two total reflection surfaces. FIG. 1 shows the disposition of the active surfaces and the beam path. The light entry surface 2 is at an incident angle $\alpha$ different from 90° to the incident direction of a light beam 1 from a light source 1a. The first total reflection surface 3 makes an angle $\phi$ with the light entry surface 2. The two angles $\alpha$ and $\phi$ are chosen so that, for a light beam with a short wavelength $1_K$ refracted at the light entry surface 2, there is an incident angle $\theta_K$ at the first total reflection surface 3 which is larger than an incident angle $\theta_L$ of a refracted light beam of longer wavelength $1_L$. The second total reflection surface 4 is parallel to the first total reflection surface 3, and the light exit surface 5, which refracts the refracted and reflected light beams $1_K$ and/or $1_S$ and/or $1_L$, is parallel to the light entry surface 2. The length 1 of the body preferably is chosen so that two total reflections take place and thus a phase difference of 90° results.

The achromatic phase retarder of the invention can be used in optical arrangements which work with a polychromatic or with a monochromatic or with a tunable dye laser.

Figure 2:
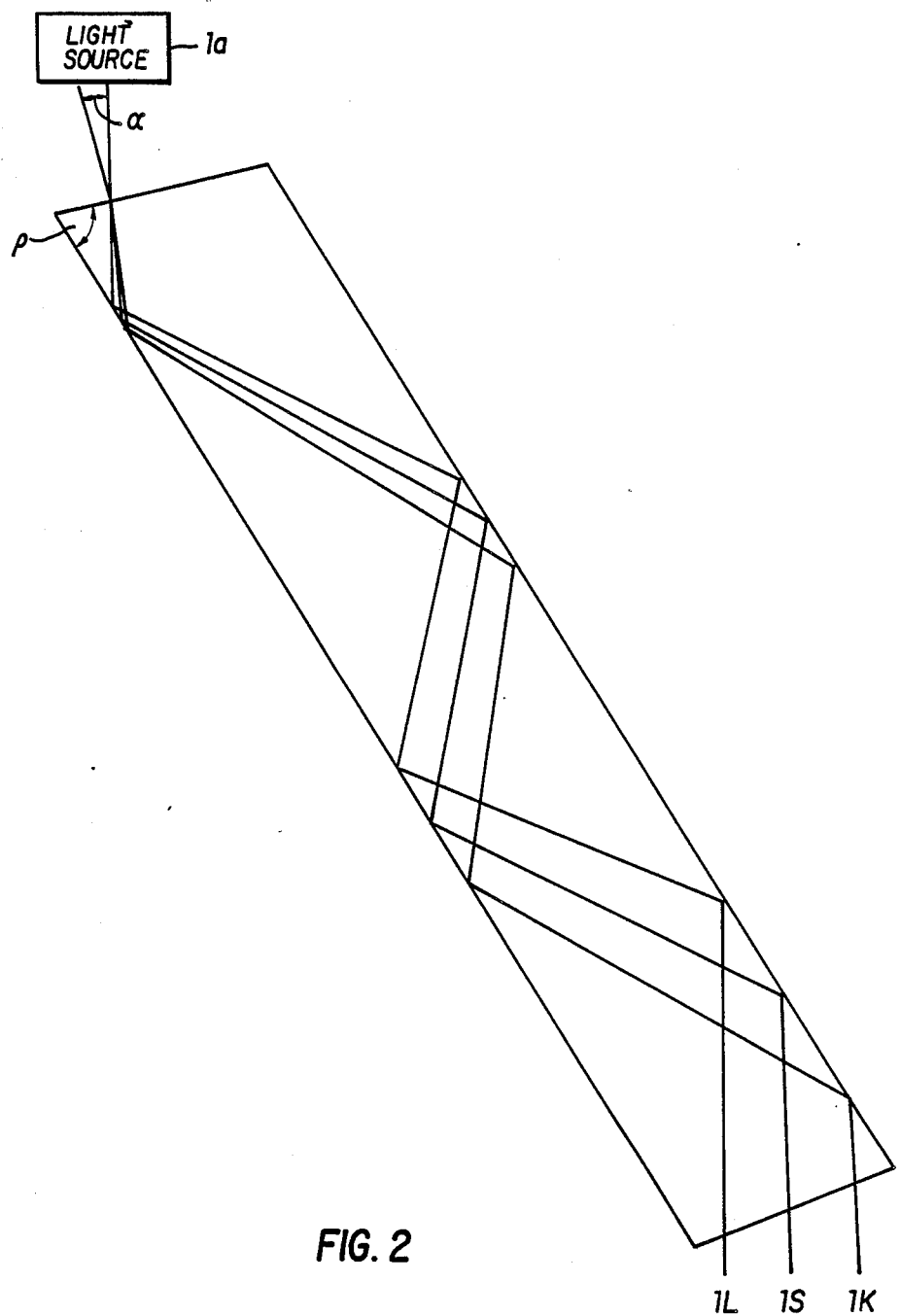
FIG. 2 shows the design of the achromatic phase retarder for generating a phase difference of 180°.

FIG. 2 shows an achromatic phase retarder which is designed to produce a phase difference of 180°. The length 1 of the body is chosen so that four total reflections take place.

Figure 3:
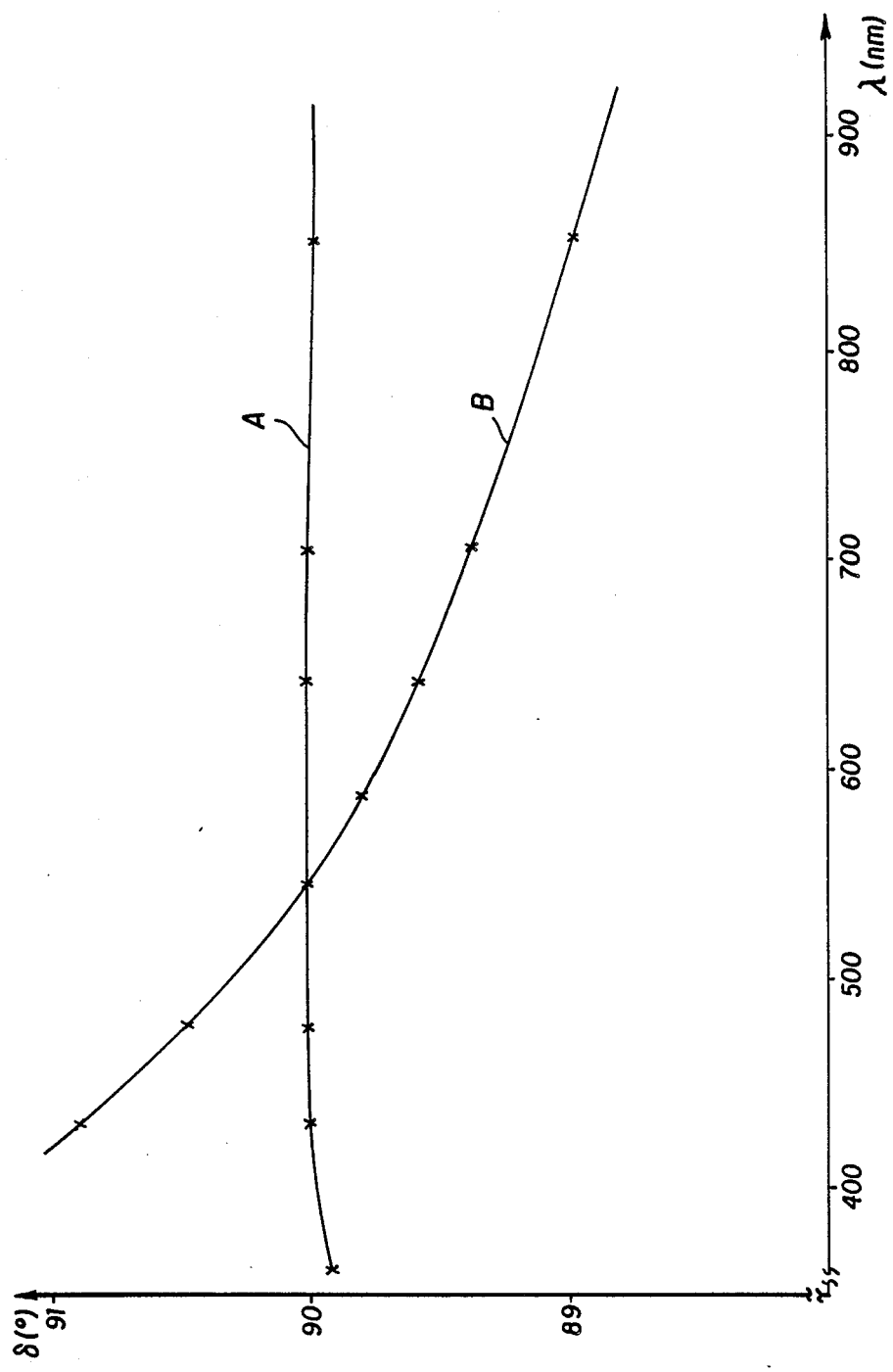
FIG. 3 shows the characteristic curve of the inventive achromatic phase retarder.

FIG. 3 shows the variation of the phase difference as a function of the wavelength of the light beam 1. The characteristic curve A shows the characteristic of the achromatic phase retarder of the invention and the characteristic curve B shows the characteristic of a FRESNEL rhombus.

We claim:

1. In an achromatic phase retarder arrangement comprising at least one prismatic body with two total reflection surfaces and a source of a light beam directed toward said body, the improvement wherein the body has a light entry surface at an angle of incidence ($\alpha$) different from 90° to the incidence direction of the light beam, wherein the light beam has an incident angle ($\alpha$) at the light entry surface so that the difference between the angles of refraction of the short wavelength light and a medium wavelength light or the difference between the angles of refraction of medium wavelength light and long wavelength light is identical with the difference between the corresponding angles of incidence ($\theta_K$, $\theta_S$, $\theta_L$) at the first total reflection surface according to the relation:

$$|\text{arc sin }(\sin \alpha/n_S) - \text{arc sin }(\sin \alpha/n_K)| = |\theta_S - \theta_K|$$

or $$|\text{arc sin }(\sin \alpha/n_L) - \text{arc sin }(\sin \alpha/n_S)| = |\theta_L - \theta_S|$$

wherein $\alpha$ is the angle of incidence of the light entry surface, $n_L$ is the refractive index for medium wavelength light, $n_K$ is the refractive index for short wavelength light, $\theta_L$ is the angle of incidence for long wavelength light, $\theta_S$ is the angle of incidence for medium wavelength light, $\theta_K$ is the angle of incidence for short wavelength light, and $\phi = \theta_S + \text{arc sin }(\sin \alpha/n_S)$, and wherein a first total reflection surface of the body makes an angle ($\phi$) with the light entry surface, the two angles ($\alpha$, $\phi$) being selected so that, for a light beam of short wavelength, refracted at the light entry surface, an angle of incidence ($\theta_K$) results at the first total reflection surface, which is larger than the angle of incidence ($\theta_L$) of a refracted light beam of a longer wavelength, and a second surface of total reflection of the body is parallel to the first surface of total reflection, and a light exit surface of the body refracts the refracted and reflected light beams ($1_L$, $1_S$, $1_K$) and is parallel to the light entry surface.

2. The achromatic phase retarder arrangement of claim 1, wherein the retarder comprises a transparent material with a refractive index $n_c \leq 1.7$ and a stress-optical constant $B \geq 0.5$ TPa$^{-1}$.

* * * * *